(12) United States Patent
Chimbe et al.

(10) Patent No.: US 11,052,904 B2
(45) Date of Patent: Jul. 6, 2021

(54) CONTROLLER FOR AUTOMATIC TRANSMISSION AND METHOD FOR CONTROLLING AUTOMATIC TRANSMISSION

(71) Applicants: TOYOTA JIDOSHA KABUSHIKI KAISHA, Toyota (JP); AISIN AW CO., LTD., Anjo (JP)

(72) Inventors: Tomohiro Chimbe, Kariya (JP); Keisuke Ota, Toyota (JP); Yuji Kajiyama, Anjo (JP); Daiki Fukuda, Anjo (JP); Kazuki Imanishi, Anjo (JP); Takuma Sugino, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/789,577

(22) Filed: Feb. 13, 2020

(65) Prior Publication Data
US 2020/0276968 A1    Sep. 3, 2020

(30) Foreign Application Priority Data
Feb. 28, 2019    (JP) .............................. JP2019-036745

(51) Int. Cl.
*B60W 20/30*    (2016.01)
*F16H 63/50*    (2006.01)
*F16H 61/04*    (2006.01)

(52) U.S. Cl.
CPC .............. *B60W 20/30* (2013.01); *F16H 61/04* (2013.01); *F16H 63/502* (2013.01);
(Continued)

(58) Field of Classification Search
None
See application file for complete search history.

(56) References Cited

U.S. PATENT DOCUMENTS 6,270,444 B1 * 8/2001 Tsutsui ................ F16H 61/0437
475/127
6,626,786 B2 * 9/2003 Hayabuchi .......... F16H 61/0437
475/127
(Continued)

FOREIGN PATENT DOCUMENTS

| JP | 2006-112247 A | 4/2006 |
| JP | 2008-106841 A | 5/2008 |
| JP | 2010-127359 A | 6/2010 |

*Primary Examiner* — Dirk Wright
(74) *Attorney, Agent, or Firm* — Oliff PLC (57) ABSTRACT

When starting a skip downshift, a controller for an automatic transmission disengages two or more engagement elements that are in an engaged state. The disengaging two or more engagement elements includes setting a first engagement element, which is one of the two or more engagement elements that are disengaged and is used to form an intermediate gear stage having a lower transmission ratio than a post-shifting gear stage, to an engagement preparation state that maintains a state immediately before the engaged state. Subsequently, the controller engages a second engagement element, which is used to form both the intermediate gear stage and the post-shifting gear stage, and temporarily increases engagement pressure of the first engagement element. The controller disengages the first engagement element and engages a third engagement element, which is used to form the post-shifting gear stage, to form the post-shifting gear stage.

5 Claims, 6 Drawing Sheets

(52) U.S. Cl.
CPC ............... *F16H 2061/0444* (2013.01); *F16H 2200/0069* (2013.01); *F16H 2200/2041* (2013.01)

(56) References Cited

U.S. PATENT DOCUMENTS

| | | | |
|---|---|---|---|
| 6,832,976 B2 * | 12/2004 | Nishida | F16H 61/061 475/118 |
| 6,955,629 B2 * | 10/2005 | Nishida | F16H 61/061 477/143 |
| 6,997,843 B2 * | 2/2006 | Saitou | F16H 61/08 475/269 |
| 8,137,241 B2 * | 3/2012 | Bai | F16H 63/502 477/110 |
| 8,187,150 B2 * | 5/2012 | Fukushiro | F16H 61/08 477/133 |
| 9,346,457 B2 * | 5/2016 | Choi | F16H 61/06 |

* cited by examiner

|  | Clutch | | | | Brake | |
| --- | --- | --- | --- | --- | --- | --- |
|  | C1 | C2 | C3 | C4 | B1 | B2 |
| 1st Speed Stage | ○ | ○ | — | — | — | ○ |
| 2nd Speed Stage | ○ | — | — | — | ○ | ○ |
| 3rd Speed Stage | — | ○ | — | — | ○ | ○ |
| 4th Speed Stage | — | — | — | ○ | ○ | ○ |
| 5th Speed Stage | — | ○ | — | ○ | ○ | — |
| 6th Speed Stage | ○ | — | — | ○ | ○ | — |
| 7th Speed Stage | ○ | — | ○ | ○ | — | — |
| 8th Speed Stage | — | — | ○ | ○ | ○ | — |
| 9th Speed Stage | ○ | — | ○ | — | ○ | — |
| 10th Speed Stage | — | ○ | ○ | — | ○ | — |

○ : Engaged  — : Disengaged

CONTROLLER FOR AUTOMATIC TRANSMISSION AND METHOD FOR CONTROLLING AUTOMATIC TRANSMISSION

BACKGROUND

1. Field

The following description relates to a controller for an automatic transmission and a method for controlling an automatic transmission.

2. Description of Related Art

Japanese Laid-Open Patent Publication No. 2010-127359 discloses a planetary gear type automatic transmission that includes friction-type engagements, namely, clutches and brakes, and an input shaft configured to be connected to an output shaft of an internal combustion engine. Each of the engagement elements is configured to be switched between an engaged state and a disengaged state. A change in the combination of engagement elements that are in the engaged state changes the gear stage of the automatic transmission.

In the automatic transmission described above, when performing a downshift, which shifts to a gear stage having a higher transmission ratio than the pre-shifting gear stage, the engagement elements are disengaged so that the automatic transmission enters a neutral state to quickly increase the rotation speed of the input shaft of the automatic transmission to a post-shifting synchronized rotation speed. After the rotation speed of the input shaft is quickly increased to the post-shifting synchronized rotation speed, the engagement elements corresponding to the post-shifting gear stage are engaged to complete the downshift.

When performing a skip downshift, which shifts the gear stage down two or more gear stages through a single shifting operation, the difference in the rotation speed of the input shaft of the automatic transmission between before and after the shifting is greater than when performing a normal downshift, which shifts the gear stage to a lower gear stage one stage at a time. To shorten the time of performing the skip downshift, the rotation speed of the input shaft may be more quickly increased during the shifting. However, if the increase rate of the rotation speed of the input shaft is increased, shock may occur when the engagement elements are engaged to complete the shifting to the post-shifting gear stage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for an automatic transmission of a planetary gear type. The automatic transmission includes multiple friction-type engagement elements and an input shaft configured to be connected to an output shaft of an internal combustion engine. Each of the engagement elements is configured to be switched between an engaged state and a disengaged state. A change in combination of ones of the engagement elements that are in the engaged state changes a gear stage of the automatic transmission. The controller includes processing circuitry. The processing circuitry is configured, when starting a skip downshift that shifts the gear stage from a pre-shifting gear stage to a post-shifting gear stage, which is two or more stages lower than the pre-shifting gear stage, through a single shifting operation, to execute disengaging two or more of the engagement elements that are in the engaged state. The disengaging two or more of the engagement elements includes a first process that sets a first engagement element to an engagement preparation state that maintains a state immediately before the engaged state. The first engagement element is one of the two or more of the engagement elements that are disengaged and is used to form the intermediate gear stage. The intermediate gear stage has a lower transmission ratio than a post-shifting gear stage. The processing circuitry is further configured, after executing the first process, to execute a second process that engages a second engagement element, which is one of the engagement elements used to form both the intermediate gear stage and the post-shifting gear stage, and temporarily increases engagement pressure of the first engagement element. The processing circuitry is further configured, after executing the second process, to execute a third process that disengages the first engagement element and engages a third engagement element, which is one of the engagement elements used to form the post-shifting gear stage, to form the post-shifting gear stage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a controller for an automatic transmission will now be described with reference to FIGS. 1 to 6.

Figure 1:
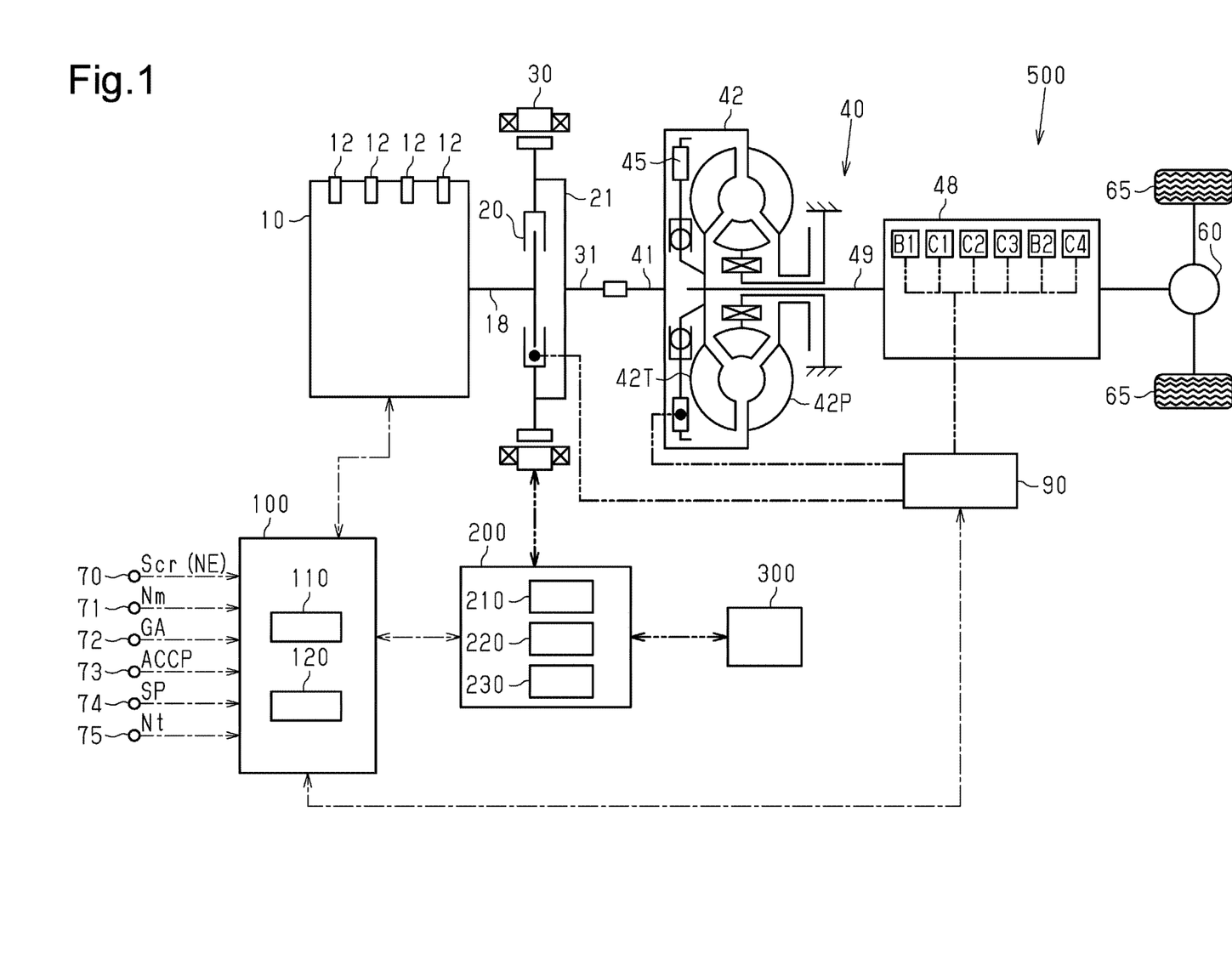
FIG. 1 is a diagram of a vehicle including an embodiment of a controller for an automatic transmission.

As shown in FIG. 1, a vehicle 500 is a hybrid vehicle on which two prime movers, including an internal combustion engine 10 and an electric motor 30, are mounted. The internal combustion engine 10 includes fuel injection valves 12 that supply fuel to respective cylinders. In the combustion chamber of each cylinder, a mixture of drawn air and fuel injected from the fuel injection valve 12 is burned to obtain an engine output.

The output shaft of the internal combustion engine 10, namely, a crankshaft 18, is connected to an output shaft 31 of the electric motor 30 by a clutch mechanism 20. The output shaft 31 of the electric motor 30 is connected to an output shaft 21 of the clutch mechanism 20.

When the clutch mechanism 20 is in a coupled state, the crankshaft 18 is coupled to the output shaft 31 of the electric motor 30. When the clutch mechanism 20 is in an uncoupled state, the crankshaft 18 is uncoupled from the output shaft 31 of the electric motor 30.

The electric motor 30 supplies and receives power to and from a high voltage battery 300 for driving the vehicle through a power control unit (PCU) 200. The PCU 200 includes a boost converter 210 that increases direct current voltage received from the high voltage battery 300 and outputs the increased voltage, an inverter 220 that converts the direct current voltage increased by the boost converter 210 into alternating current voltage and sends the alternating current voltage to the electric motor 30, and a DC-DC converter 230 that decreases the direct current voltage of the high voltage battery 300 to a voltage for driving auxiliary devices. The PCU 200 detects the state of charge SOC of the high voltage battery 300 (SOC=Amount of Change in Battery [Ah]/Capacity of Battery [Ah]×100%).

The output shaft 21 of the clutch mechanism 20 is connected to an input shaft 41 of an automatic transmission 40. The input shaft 41 is connected to the crankshaft 18 by the clutch mechanism 20.

The automatic transmission 40 is a ten-stage transmission of a planetary gear type and includes a torque converter 42 including a lockup clutch 45 and a multi-step transmission unit 48 that changes the transmission ratio in a stepped manner. The output shaft of the automatic transmission 40 is connected to a differential gear 60. The output shaft of the differential gear 60 is connected to drive wheels 65 of the vehicle 500.

The torque converter 42 includes a pump impeller 42P connected to the input shaft 41 of the automatic transmission 40 and a turbine impeller 42T connected to an input shaft 49 of the transmission unit 48. In the torque converter 42, transmission of torque between the pump impeller 42P and the turbine impeller 42T through automatic transmission fluid (ATF) transmits torque between the input shaft and the output shaft of the torque converter 42.

The transmission unit 48 includes multiple planetary gear mechanisms and multiple friction-type engagement elements, namely, for clutches C1 to C4 and two brakes B1 and B2. Each of the first to fourth clutches C1 to C4 and the first and second brakes B1 and B2 is configured to be switched between an engaged state and a disengaged state. A change in the combination of engagement elements that are in the engaged state changes the gear stage of the transmission unit 48. The second brake B2 is an engagement element that stops rotation of the ring gear of one of the multiple planetary gear mechanisms. When rotation of the ring gear of the planetary gear mechanism is stopped, if the carrier holding planetary gears serves as an input shaft and the sun gear serves as an output shaft, the rotation speed of the sun gear is increased.

Figure 2:
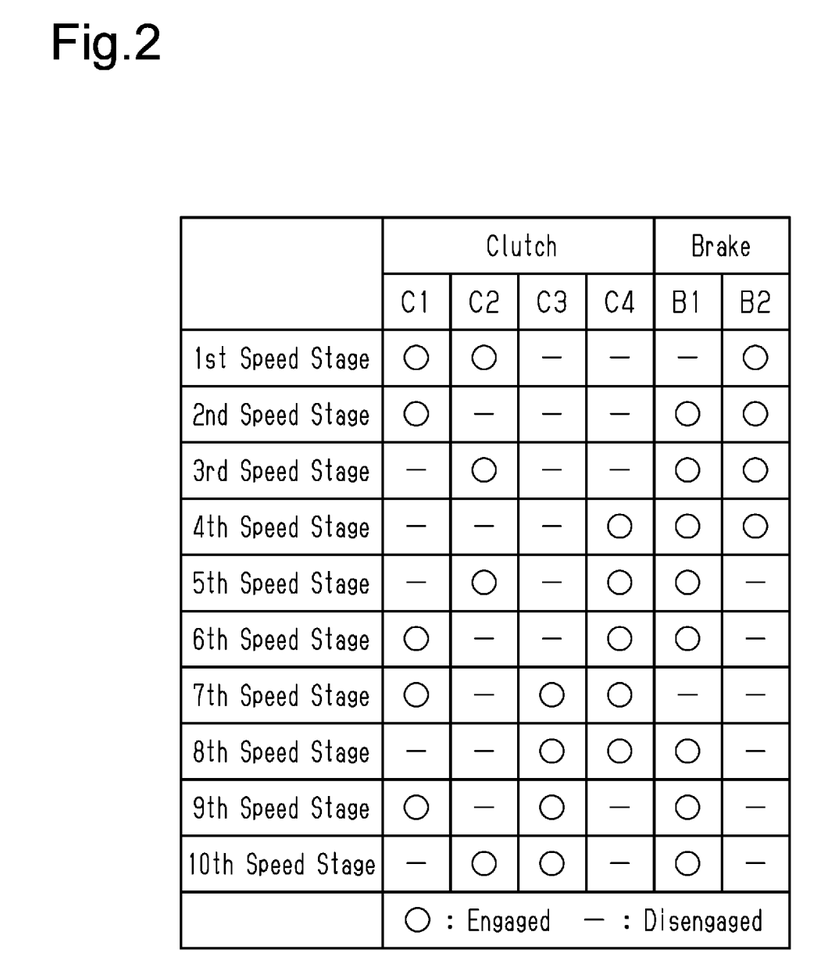
FIG. 2 is a table showing the relationship between each gear stage and engagement elements of the automatic transmission shown in FIG. 1.

FIG. 2 shows the relationship between the forward gear stages and the engagement elements of the transmission unit 48. The transmission unit 48 is configured so that as the numeral indicating a gear stage (e.g., "1" for the first speed stage) increases, the transmission ratio decreases. In the description hereafter, engagement elements that are set to the engaged state to form the n-th speed stage ($1 \leq n \leq 10$) are referred to as the engagement elements forming the n-th speed stage or the engagement elements used to form the n-th speed stage.

The engagement elements forming the first speed stage, which has the highest transmission ratio, that is, the engagement elements that are set to the engaged state to form the first speed stage, are the first clutch C1, the second clutch C2, and the second brake B2. The remaining engagement elements, which are the third clutch C3, the fourth clutch C4, and the first brake B1, are set to the disengaged state.

The engagement elements that are set to the engaged state to form the second speed stage are the first clutch C1, the first brake B1, and the second brake B2. The remaining engagement elements, which are the second clutch C2, the third clutch C3, and the fourth clutch C4, are set to the disengaged state.

The engagement elements that are set to the engaged state to form the third speed stage are the second clutch C2, the first brake B1, and the second brake B2. The remaining engagement elements, which are the first clutch C1, the third clutch C3, and the fourth clutch C4, are sent to the disengaged state.

The engagement elements that are set to the engaged state to form the fourth speed stage are the fourth clutch C4, the first brake B1, and the second brake B2. The remaining engagement elements, which are the first clutch C1, the second clutch C2, and the third clutch C3, are set to the disengaged state.

The engagement elements that are set to the engaged state to form the fifth speed stage are the second clutch C2, the fourth clutch C4, and the first brake B1. The remaining engagement elements, which are the first clutch C1, the third clutch C3, and the second brake B2, are set to the disengaged state.

The engagement elements that are set to the engaged state to form the sixth speed stage are the first clutch C1, the fourth clutch C4, and the first brake B1. The remaining engagement elements, which are the second clutch C2, the third clutch C3, and the second brake B2, are set to the disengaged state.

The engagement elements that are set to the engaged state to form the seventh speed stage are the first clutch C1, the third clutch C3, and the fourth clutch C4. The remaining engagement elements, which are the second clutch C2, the first brake B1, and the second brake B2, are set to the disengaged state.

The engagement elements that are set to the engaged state to form the eighth speed stage are the third clutch C3, the fourth clutch C4, and the first brake B1. The remaining engagement elements, which are the first clutch C1, the second clutch C2, and the second brake B2, are set to the disengaged state.

The engagement elements that are set to the engaged state to form the ninth speed stage are the first clutch C1, the third clutch C3, and the first brake B1. The remaining engagement elements, which are the second clutch C2, the fourth clutch C4, and the second brake B2, are set to the disengaged state.

The engagement elements that are set to the engaged state to form the tenth speed stage, which has the lowest transmission ratio, are the second clutch C2, the third clutch C3, and the first brake B1. The remaining engagement elements, which are the first clutch C1, the fourth clutch C4, and the second brake B2, are set to the disengaged state.

As described above, in the present embodiment, three of the multiple engagement elements are set to the engaged state to form a gear stage. When one of the three engagement elements in the engaged state is changed to another engagement element, the gear stage is changed to the next higher gear stage (e.g., changed from the fourth speed stage to the fifth speed stage) or to the next lower gear stage (e.g., changed from the fourth speed stage to the third speed stage).

When performing a skip downshift, which shifts the gear stage down two or more gear stages (e.g., shift from the fourth speed stage to the second speed stage or shift from the eighth speed stage to the third speed stage) through a single shifting operation, two of the three engagement elements in the engaged state are changed to other two engagement elements. A situation in which such a skip downshift is performed includes, for example, a case in which the driver of the vehicle requests a very quick acceleration. More specifically, for example, a case in which the accelerator pedal is greatly depressed so that a kickdown shift is performed is included.

When a vehicle has a manual transmission mode in which the driver of the vehicle operates a shift-up switch or a shift-down switch to change the gear stage, the skip downshift may be performed when the shift-down switch is continuously operated.

A hydraulic circuit 90, which controls the automatic transmission 40 and the clutch mechanism 20, is supplied with hydraulic oil from an oil pump (not shown). The hydraulic circuit 90 is connected to the transmission unit 48, the lockup clutch 45, and the clutch mechanism 20. Operation of the clutches C1 to C4 and the brakes B1 and B2 of the transmission unit 48, operation of the lockup clutch 45, and operation of the clutch mechanism 20 are performed through control of the hydraulic circuit 90.

Various controls including control of the internal combustion engine 10, control of the electric motor 30, and control of the hydraulic circuit 90 are executed by a controller 100 mounted on the vehicle 500.

The controller 100 includes a central processing unit 110 (hereinafter, referred to as CPU) and a memory 120 storing programs and data that are used in control. The CPU 110 executes the programs stored in the memory 120 to execute various kinds of control. Although not shown in the drawings, the controller 100 is configured by multiple control units such as a control unit for the internal combustion engine, a control unit for the PCU, and a control unit for the automatic transmission.

The controller 100 is connected to a crank angle sensor 70 that detects a rotation angle of the crankshaft 18, a rotation speed sensor 71 that detects a motor rotation speed Nm, that is, a rotation speed of the electric motor 30, and an airflow meter 72 that detects an intake air amount GA of the internal combustion engine 10. The controller 100 receives an output signal from each of the sensors. The controller 100 is also connected to an accelerator position sensor 73 that detects an accelerator operation amount ACCP, which is an amount the accelerator pedal is depressed, a vehicle speed sensor 74 that detects a vehicle speed SP of the vehicle 500, and a rotation speed sensor 75 that detects a turbine rotation speed Nt, which is a rotation speed of the turbine impeller 42T. The controller 100 receives an output signal from each of the sensors. The controller 100 calculates an engine rotation speed NE based on an output signal Scr of the crank angle sensor 70. The controller 100 also calculates an engine load factor KL based on the engine rotation speed NE and the intake air amount GA.

The controller 100 causes the vehicle 500 to travel in one of a motor drive mode, a hybrid drive mode, and an engine drive mode. In the motor drive mode, the controller 100 uncouples the clutch mechanism 20 and rotates the drive wheels 65 with driving power of the electric motor 30. In the hybrid drive mode, the controller 100 couples the clutch mechanism 20 and rotates the drive wheels 65 with driving power of the internal combustion engine 10 and the electric motor 30. In the engine drive mode, the controller 100 couples the clutch mechanism 20 and rotates the drive wheels 65 with driving power of the internal combustion engine 10.

Figure 3:
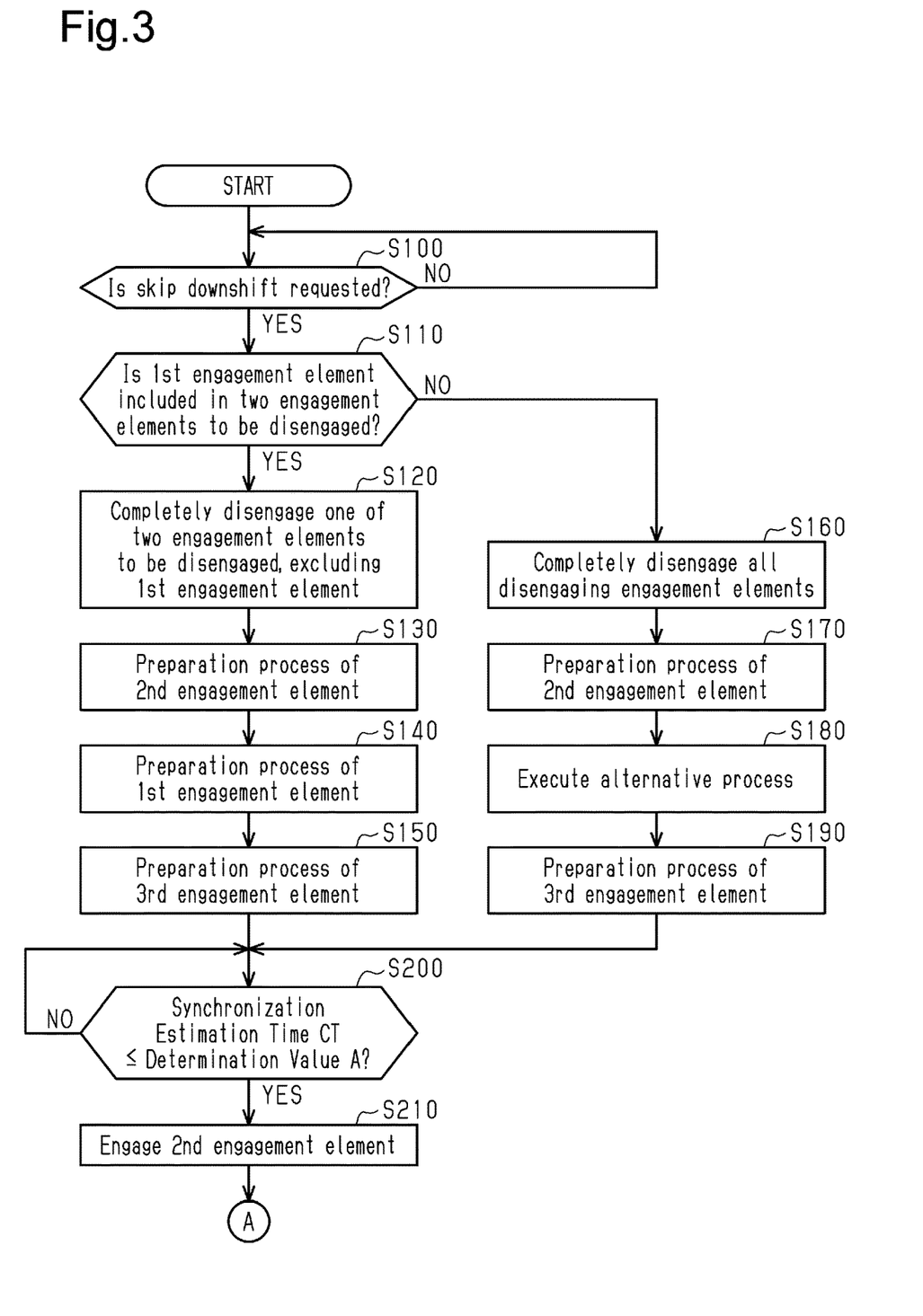
FIG. 3 is a flowchart showing the procedures of a process executed by the controller shown in FIG. 1.
Figure 4:
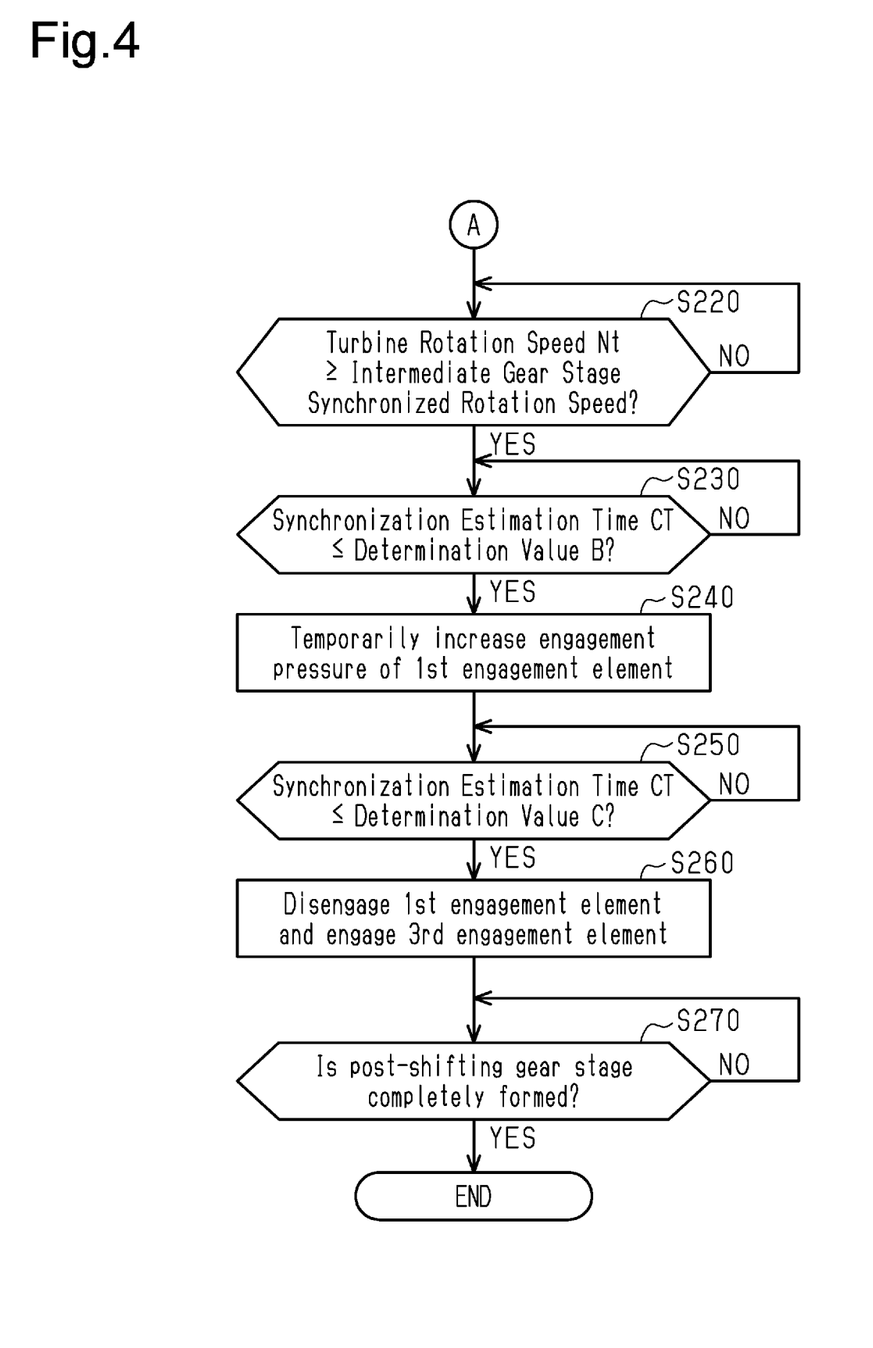
FIG. 4 is a flowchart showing the procedures of a process executed by the controller shown in FIG. 1.

The process executed by the controller 100 for performing the skip downshift during travel of the vehicle will now be described with reference to FIGS. 3 and 4. FIGS. 3 and 4 show a skip downshift process implemented by the CPU 110 executing a program stored in the memory 120 of the controller 100. In the following description, the number of each step is represented by the letter S followed by a numeral.

When starting the process shown in FIG. 3, the controller 100 determines whether or not a request of the skip downshift is issued (S100). During travel of the vehicle, the controller 100 repeatedly executes the process of S100 until a request of the skip downshift is issued.

If it is determined that a request of the skip downshift is issued (S100: YES), the controller 100 determines whether or not a first engagement element E1 is included in the two engagement elements that are to be disengaged to change from the pre-shifting gear stage to the post-shifting gear stage (S110). The first engagement element E1 is one of the two engagement elements that are disengaged to change from the pre-shifting gear stage to the post-shifting gear stage and is configured to form an intermediate gear stage. The intermediate gear stage has a lower transmission ratio than the post-shifting gear stage. In addition, the intermediate gear stage is a gear stage between the pre-shifting gear stage and the post-shifting gear stage. In the present embodiment, two of the three engagement elements forming the post-shifting gear stage are the same as the two of the three engagement elements forming the intermediate gear stage. The remaining one of the three engagement elements forming the post-shifting gear stage differs from the remaining one of the three engagement elements forming the intermediate gear stage. The intermediate gear stage changes depending on the pre-shifting gear stage and the post-shifting gear stage.

If it is determined that the first engagement element E1 is included (S110: YES), the controller 100 executes the process from S120 to start the skip downshift.

In S120, the controller 100 completely disengages one of the two engagement elements to be disengaged, excluding the first engagement element E1. The term "completely disengaging" refers to stopping of the supply of hydraulic pressure to an engagement element so that the engagement element is set to the disengaged state.

The controller 100 executes a process for preparing a second engagement element E2 (S130). The second engagement element E2 is an engagement element that is used to form both the intermediate gear stage and the post-shifting gear stage.

The preparation process supplies hydraulic pressure to the corresponding engagement element so that the engagement element is set to an engagement preparation state. The engagement preparation state is a state in which the engagement element is maintained immediately before the engaged state, and is included in the disengaged state. More specifically, in the present embodiment, the engagement preparation state refers to a state in which friction members of the engagement elements are in contact with each other and the transmission torque capacity is substantially zero. However, the engagement preparation state may be any state as long as the engagement element is in a state immediately before the engaged state. For example, the engagement preparation state may be a state in which the friction members of the engagement elements are located closer to each other than when the hydraulic pressure is not applied to the engagement elements and the transmission torque capacity is zero.

When the preparation process is started in S130, the controller 100 temporarily increases an instruction pressure Cp, which is a target value of hydraulic pressure applied to the second engagement element E2, to an apply pressure AP, which is used to execute a quick-apply control. The quick-apply control is a control that temporarily increases the hydraulic pressure applied to the engagement element so that when changing the engagement element from the disengaged state to the engaged state, the hydraulic oil is promptly supplied to the engagement element. After the instruction pressure Cp is maintained at the apply pressure AP for a specified amount of time, the controller 100 decreases the instruction pressure Cp to a preparation pressure PP, at which the engagement element is maintained in the engagement preparation state, and maintains the instruction pressure Cp at the preparation pressure PP until the second engagement element E2 starts to be engaged.

The controller 100 executes a preparation process for setting the first engagement element E1 to the engagement preparation state (S140). In the preparation process shown in S140, the quick-apply control is not executed, and the instruction pressure Cp of the first engagement element E1, which is in the engaged state, is decreased to the preparation pressure PP so that the first engagement element E1 is set to the engagement preparation state. Until the first engagement element E1 starts to be engaged, the instruction pressure Cp is maintained at the preparation pressure PP. The process shown in S140 corresponds to a first process that sets the first engagement element E1, which is used to form the intermediate gear stage having a lower transmission ratio than the post-shifting gear stage, to the engagement preparation state.

The controller 100 executes a preparation process of a third engagement element E3 in the same manner as the preparation process of the second engagement element E2, that is, the preparation process shown in S130 (S150). The third engagement element E3 is an engagement element that is set to the engaged state to form the post-shifting gear stage.

The controller 100 determines whether or not a synchronization estimation time CT is less than or equal to a determination value A (S200). The synchronization estimation time CT refers to a time that the current turbine rotation speed Nt takes to reach a synchronized rotation speed of the post-shifting gear stage. The controller 100 calculates the synchronization estimation time CT based on a change rate of the turbine rotation speed Nt during shifting and the current turbine rotation speed Nt. The determination value A is set in advance so that it is appropriately determined based on the synchronization estimation time CT becoming less than or equal to the determination value A that the time is suitable for starting to engage the second engagement element E2.

The controller 100 repeatedly executes the process of S200 until it is determined that the synchronization estimation time CT is less than or equal to the determination value A.

If it is determined that the synchronization estimation time CT is less than or equal to the determination value A (S200: YES), the controller 100 increases the hydraulic pressure supplied to the second engagement element E2 so that the second engagement element E2 is engaged (S210).

As shown in FIG. 4, after the process of S210 is executed, the controller 100 determines whether or not the turbine rotation speed Nt is greater than or equal to a synchronized rotation speed of the intermediate gear stage (S220). The controller 100 repeatedly executes the process of S220 until it is determined that the turbine rotation speed Nt is greater than or equal to the synchronized rotation speed of the intermediate gear stage.

If it is determined that the turbine rotation speed Nt is greater than or equal to the synchronized rotation speed of the intermediate gear stage (S220: YES), the controller 100 determines whether or not the current synchronization estimation time CT is less than or equal to a determination value B (S230). The determination value B is set in advance so that it is appropriately determined based on the synchronization estimation time CT becoming less than or equal to the determination value B that the time is suitable for starting to decrease an increase rate Ntd of the turbine rotation speed Nt during shifting.

The controller 100 repeatedly executes the process of S230 until it is determined that the synchronization estimation time CT is less than or equal to the determination value B.

If it is determined that the synchronization estimation time CT is less than or equal to the determination value B (S230: YES), the controller 100 executes a process that temporarily increases the hydraulic pressure supplied to the first engagement element E1 to temporarily increase engagement pressure of the first engagement element E1 (S240). In S240, the controller 100 adjusts the instruction pressure Cp of the first engagement element E1 through feedback control so that the increase rate Ntd of the turbine rotation speed Nt is set to a specified value. The process shown in S210 and the process shown in S240 correspond to a second process that engages the second engagement element E2, which is used to form both the intermediate gear stage and the post-shifting gear stage, and temporarily increases engagement pressure of the first engagement element.

The controller 100 determines whether or not the current synchronization estimation time CT is less than or equal to a determination value C (S250). The determination value C is set in advance so that it is appropriately determined based on the synchronization estimation time CT becoming less than or equal to the determination value C that the current turbine rotation speed Nt is proximate to the synchronized rotation speed of the post-shifting gear stage and that the time is suitable for starting the process of S260 that completes the forming of the post-shifting gear stage.

The controller 100 repeatedly executes the process of S250 until it is determined that the synchronization estimation time CT is less than or equal to the determination value C.

If it is determined that the synchronization estimation time CT is less than or equal to the determination value C (S250: YES), the controller 100 disengages the first engagement element E1 and engages the third engagement element E3 to start a process that completes the forming of the post-shifting gear stage (S260). In S260, a decrease rate of the instruction pressure Cp of the first engagement element E1 and an increase rate of the instruction pressure Cp of the third engagement element E3 are adjusted so that the first engagement element E1 and the third engagement element E3 are appropriately switched. Ultimately, the first engagement element E1 is completely disengaged, and the third engagement element E3 is completely engaged so that the third engagement element E3 will not slip. The process shown in S260 corresponds to a third process that disengages the first engagement element E1 and engages the third engagement element E3, which is used to form the post-shifting gear stage, to form the post-shifting gear stage.

The controller 100 determines whether or not the forming of the post-shifting gear stage is completed (S270). In S270, if the turbine rotation speed Nt is equal to the synchronized rotation speed of the post-shifting gear stage, the controller 100 determines that the forming of the post-shifting gear stage is completed. The controller 100 repeatedly executes the process of S270 until it is determined that the forming of the post-shifting gear stage is completed.

If it is determined that the forming of the post-shifting gear stage is completed (S270: YES), the controller 100 ends the process.

In the process of S110 shown in FIG. 3, if it is determined that the first engagement element E1 is not included in the two engagement elements that are to be disengaged to change from the pre-shifting gear stage to the post-shifting gear stage (S110: NO), the controller 100 executes the process from S160 to start the skip downshift.

In S160, the controller 100 completely disengages all of the engagement elements that are to be disengaged.

The controller 100 executes a process for preparing the second engagement element E2 (S170). The process of S170 is the same as the process of S130 described above.

The controller 100 executes an alternative process (S180). The alternative process is executed instead of executing the process of S140 to consider an engagement element that is used to form both the intermediate gear stage and a gear stage between the pre-shifting gear stage and the intermediate gear stage as the first engagement element E1 so that the engagement element is set to the engagement preparation state. In S180, when setting the first engagement element E1 to the engagement preparation state, the same process as the process of S130 is executed so that the first engagement element E1, which is in a complete disengaged state, is set to the engagement preparation state. More specifically, when executing the preparation process, a process for executing the quick-apply control is executed first.

The controller 100 executes a process for preparing the third engagement element E3 (S190). The process of S190 is the same as the process of S150.

After execution of the process of S190, the controller 100 executes the process from S200, which is described above.

Figure 5:
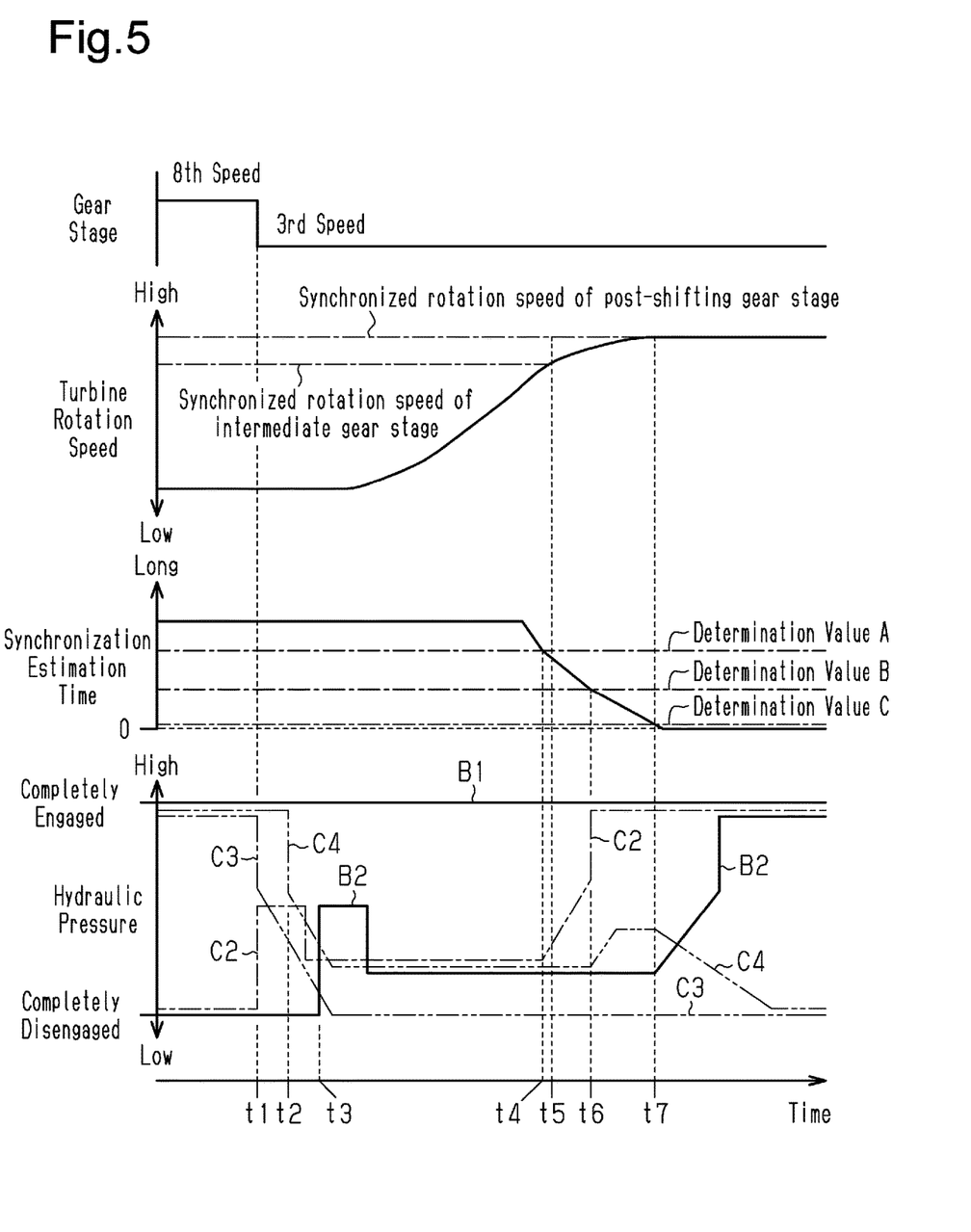
FIG. 5 is a timing chart showing an operation of the automatic transmission.

FIG. 5 shows an example of an operation of the skip downshift process. FIG. 5 shows an example of a case in which the skip downshift is performed from the eighth speed stage to the third speed stage. The gear stage corresponding to the intermediate gear stage is the fifth speed stage. In the example shown in FIG. 5, the fourth clutch C4 is the first engagement element E1, the second clutch C2 is the second engagement element E2, and the second brake B2 is the third engagement element E3. The example shown in FIG. 5 shows the operation when the first engagement element E1 is included the two engagement elements that are disengaged to change from the pre-shifting gear stage to the post-shifting gear stage, that is, when an affirmative determination is made in the process of S110 shown in FIG. 3.

At time t1, when the skip downshift is started, the process of S120 is executed to completely disengage the third clutch C3, which is one of the engagement elements, namely, the third clutch C3 and the fourth clutch C4, that is to be disengaged to change from the eighth speed stage to the third speed stage and that excludes the first engagement element E1. In addition, the process of S130 is executed to execute the preparation process of the second clutch C2, which is the second engagement element E2.

At time t2, the process of S140 is executed to disengage the fourth clutch C4, which is the first engagement element E1. The preparation process sets the fourth clutch C4 to the engagement preparation state. When the third clutch C3 and the fourth clutch C4 are disengaged, the automatic transmission 40 enters a neutral state, and the engine rotation speed NE starts to increase. In accordance with the increase in the engine rotation speed NE, the rotation speed of the input shaft 41 of the automatic transmission 40 starts to increase. In accordance with the increase in the rotation speed of the input shaft 41, the turbine rotation speed Nt increases.

At time t3, the process of S150 is executed to execute the preparation process of the second brake B2, which is the third engagement element E3.

At time t4, when the synchronization estimation time CT becomes less than or equal to the determination value A, the process of S210 is executed to engage the second clutch C2, which is the second engagement element E2.

At time t5, when the turbine rotation speed Nt exceeds the synchronized rotation speed of the intermediate gear stage, the fourth clutch C4, which is the first engagement element E1, may be engaged without a drastic increase in the turbine rotation speed Nt. Thus, occurrence of shock is limited during engaging.

At time t6, when the synchronization estimation time CT becomes less than or equal to the determination value B, the process of S240 is executed to temporarily increase the engagement pressure of the fourth clutch C4, which is the first engagement element E1, so that the fourth clutch C4, which is in the engagement preparation state, is engaged. As described above, when the fourth clutch C4, the second clutch C2, and the first brake B1 are in the engaged state, the fifth speed stage, which is the intermediate gear stage, is temporarily formed. This increases the transmission torque capacity of the automatic transmission 40, thereby decreasing the increase rate Ntd of the turbine rotation speed Nt.

At time t7, when the synchronization estimation time CT becomes less than or equal to the determination value C, the process of S260 is executed to disengage the fourth clutch C4, which is the first engagement element E1, and engage the second brake B2, which is the third engagement element E3, so that the process for completing the forming of the third speed stage, which is the post-shifting gear stage, is started (S260). When the switching of the fourth clutch C4 and the second brake B2 is completed, the fourth clutch C4 is completely disengaged, and the second brake B2 is completely engaged. This completes the forming of the post-shifting gear stage.

When the second brake B2 is set to the engaged state, the rotation speed of the sun gear is increased as described above. This causes the gears of the automatic transmission 40 to over-rotate. To limit such over-rotation of the gears, in the present embodiment, when the second brake B2 is an engagement element that is used to form the post-shifting gear stage, the second brake B2 is configured to be engaged last.

Figure 6:
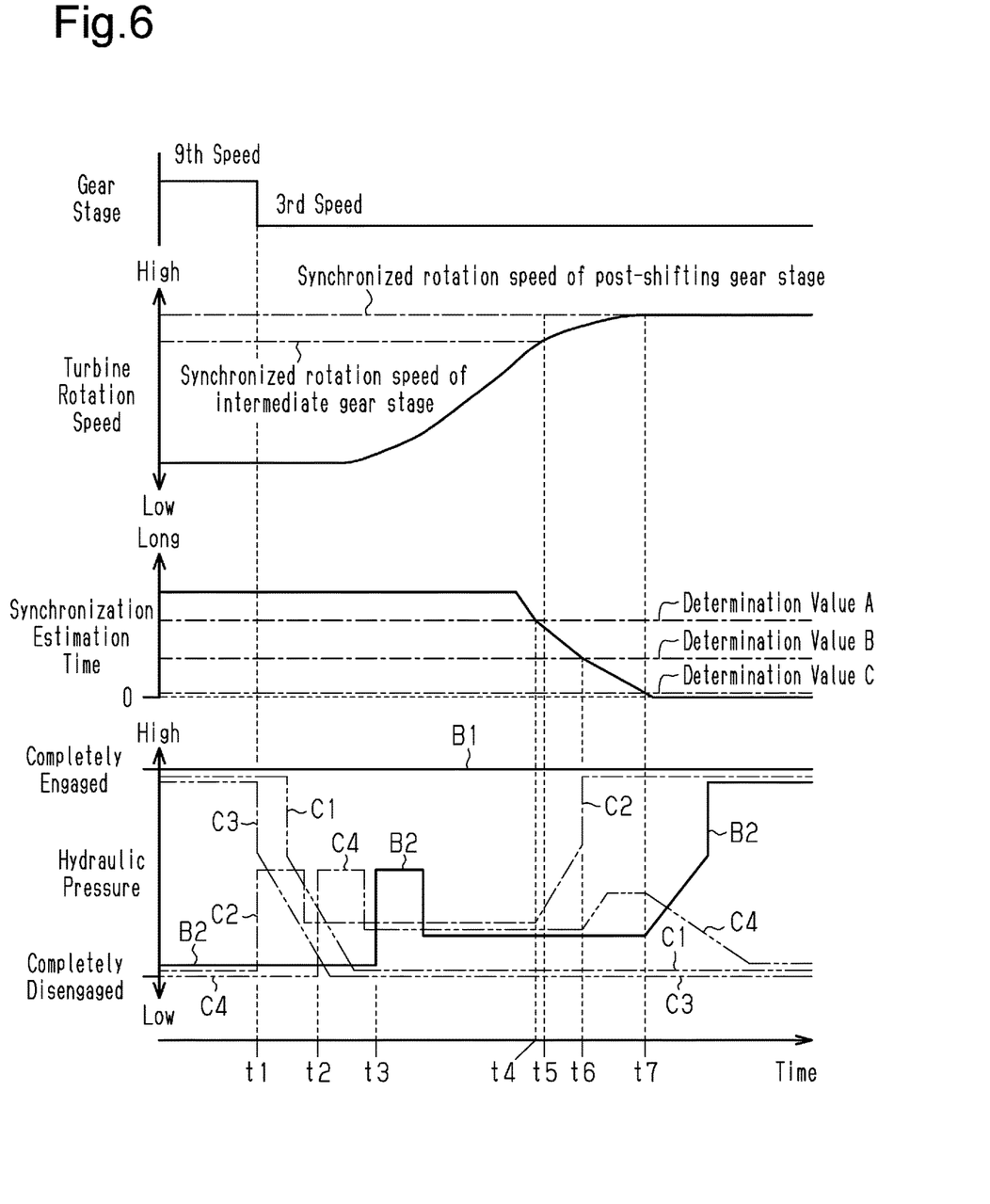
FIG. 6 is a timing chart showing an operation of the automatic transmission.

FIG. 6 shows another example of an operation of the skip downshift process. The example shown in FIG. 6, which differs from the example shown in FIG. 5, shows the operation when the first engagement element E1 is not included in the two engagement elements that are to be disengaged to change from the pre-shifting gear stage to the post-shifting gear stage, that is, when a negative determination is made in the process of S110 shown in FIG. 3.

FIG. 6 shows an example of a case in which the skip downshift is performed from the ninth speed stage to the third speed stage. The gear stage corresponding to the intermediate gear stage is the fifth speed stage. In the alternative process, a gear stage between the pre-shifting gear stage and the intermediate gear stage is the eighth speed stage. The fourth clutch C4, which is an engagement element that is used to form both the eighth speed stage and thee intermediate gear stage, is the first engagement element E1. The second engagement element E2 is the second clutch C2. The third engagement element E3 is the second brake B2.

At time t1, when the skip downshift is started, the process of S160 is executed to completely disengage the third clutch C3 and the first clutch C1, which are to be disengaged to change from the ninth speed stage to the third speed stage. In the present embodiment, the first clutch C1 is configured to be disengaged after the third clutch C3 is disengaged. When the third clutch C3 and the first clutch C1 are disengaged, the automatic transmission 40 enters a neutral state, and the engine rotation speed NE starts to increase. In accordance with the increase in the engine rotation speed NE, the rotation speed of the input shaft 41 of the automatic transmission 40 starts to increase. In accordance with the increase in the rotation speed of the input shaft 41, the turbine rotation speed Nt increases.

The process of S170 is executed to execute the preparation process of the second clutch C2, which is the second engagement element E2.

At time t2, the process of S180 is executed to execute the preparation process of the fourth clutch C4, which is the first engagement element E1, so that the fourth clutch C4 is set to the engagement preparation state.

At time t3, the process of S190 is executed to execute the preparation process of the second brake B2, which is the third engagement element E3. Once the preparation process of the second brake B2 is completed, the fourth clutch C4, which is the first engagement element E1, the second clutch C2, which is the second engagement element E2, and the second brake B2, which is the third engagement element E3, are set to the engagement preparation state, and the first brake B1, which is used to form the post-shifting gear stage, is maintained in a complete engaged state. Hence, the state is the same as that after the preparation process of the second brake B2, which is the third engagement element E3, is executed at time t3 shown in FIG. 5.

From time t3 shown in FIG. 6, the same process as that from time t3 shown in FIG. 5 is executed.

The present embodiment has the following advantages.

(1) When the skip downshift is started, multiple engagement elements including the first engagement element E1 are disengaged, so that the automatic transmission 40 enters a neutral state. As a result, the rotation speed of the input shaft 41 of the automatic transmission 40, which is connected to the crankshaft 18 of the internal combustion engine 10, is quickly increased. This shortens the time that the rotation speed of the input shaft 41 of the automatic transmission 40 takes to be increased to the post-shifting synchronized rotation speed. Thus, the shifting time is shortened.

When the process of S210 and the process of S240 are executed to form the intermediate gear stage, the transmission torque capacity of the automatic transmission 40 is increased. This moderates the increase in the rotation speed of the input shaft 41 of the automatic transmission 40. In the process of S140, the first engagement element E1 is disengaged and is in the engagement preparation state. When the process of S240 is executed to temporarily increase the engagement pressure of the first engagement element E1, the first engagement element E1 is readily set to the engaged state. Thus, increases in the rotation speed of the input shaft 41 of the automatic transmission 40 are readily limited.

As described above, after increases in the rotation speed of the input shaft 41 of the automatic transmission 40 are limited, the process of S260 is executed. This limits shock that occurs when engaging the engagement elements to complete the shift to the post-shifting gear stage. Therefore, when performing the skip downshift, the shifting time is shortened, and occurrence of shock is limited when completing the shifting.

(2) When starting the skip downshift, if none of the engagement elements that are to be disengaged to change from the pre-shifting gear stage to the post-shifting gear stage is used to form an intermediate gear stage, the alternative process shown in S180 is executed. This allows the process of S210, the process of S240, and the process of S260 to continue to be executed. Therefore, even when none of the engagement elements that are to be disengaged is used to form the intermediate gear stage, the advantage (1) is obtained. In the alternative process shown in S180, the first engagement element E1 is set to the engagement preparation state. When the process of S240 is executed to temporarily increase the engagement pressure of the first engagement element E1, the first engagement element E1 readily enters the engaged state.

(3) The automatic transmission 40 is used in a hybrid vehicle. The hybrid vehicle includes the internal combustion engine 10 and the electric motor 30 as prime movers. The hybrid vehicle further includes the clutch mechanism 20 that is configured to couple the crankshaft 18 of the internal combustion engine 10 to the output shaft 31 of the electric motor 30 in the coupled state and uncouple the crankshaft 18 from the output shaft 31 in the uncoupled state. The input shaft 41 of the automatic transmission 40 is connected to the output shaft 21 of the clutch mechanism 20.

In such a hybrid vehicle, the output shaft 21 of the clutch mechanism 20 and the output shaft 31 of the electric motor 30 are connected to the input shaft 41 of the automatic transmission 40. Hence, the input shaft 41 of the automatic transmission 40 has a greater equivalent inertia than in a vehicle that includes only the internal combustion engine 10 and does not include the electric motor 30.

When downshift is performed in a hybrid vehicle, the rotation speed of the input shaft 41 of the automatic transmission 40 increases more slowly than when downshift is performed in a vehicle that does not include the electric motor 30. In this regard, in the present embodiment, the skip downshift process is executed in the hybrid vehicle so that even when the skip downshift is performed, the shifting time is shortened, and occurrence of shock is limited during formation of the post-shifting gear stage.

The above embodiment may be modified as described below. The embodiment and the following modified examples can be combined as long as the combined modified examples remain technically consistent with each other.

If a negative determination is made in S110 shown in FIG. 3, the processes of S160, S170, S180, and S190 do not have to be executed, and the remaining processes may be executed. In the remaining processes, for example, execution of the skip downshift may be stopped.

The process of S220 shown in FIG. 4 may be omitted.

The structure of the hybrid vehicle shown in FIG. 1 is an example. The hybrid vehicle may have another structure.

The skip downshift process may be executed on the automatic transmission 40 of a vehicle that does not include the electric motor 30 and includes only the internal combustion engine 10 in addition to the automatic transmission 40 mounted on a hybrid vehicle.

The number of engagement elements that are used to form a gear stage and the number of engagement elements that are disengaged when starting the skip downshift may be changed in any manner as long as the same process as the skip downshift process is executable.

The controller 100 is not limited to one including the CPU 110 and the memory 120 and configured to execute a software process. For example, the controller 100 may include a dedicated hardware circuit (such as an ASIC) that executes at least some of the software processes executed in the above-described embodiment. More specifically, the controller 100 may have any of the following configurations (a) to (c). Configuration (a) includes a processor that executes all of the above-described processes according to programs and a program storage device such as a ROM that stores the programs. Configuration (b) includes a processor and a program storage device that execute some of the above-described processes in accordance with the programs and a dedicated hardware circuit that executes the remaining processes. Configuration (c) includes a dedicated hardware circuit that executes all of the above-described processes. Multiple software circuits each including a processor and a program storage device and multiple dedicated hardware circuits may be provided. That is, the above-described processes may be executed in any manner as long as the processes are executed by processing circuitry that includes one or more software circuits and/or one or more dedicated hardware circuits. The program storage device, or a computer readable medium, includes any medium that can be accessed from a general-purpose computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an automatic transmission of a planetary gear type, wherein the automatic transmission includes multiple friction-type engagement elements and an input shaft configured to be connected to an output shaft of an internal combustion engine, each of the engagement elements is configured to be switched between an engaged state and a disengaged state, and a change in combination of ones of the engagement elements that are in the engaged state changes a gear stage of the automatic transmission, the controller comprising:
processing circuitry that is configured to
when starting a skip downshift that shifts the gear stage from a pre-shifting gear stage to a post-shifting gear stage, which is two or more stages lower than the pre-shifting gear stage, through a single shifting operation, execute disengaging two or more of the engagement elements that are in the engaged state, wherein the disengaging two or more of the engagement elements includes a first process that sets a first engagement element to an engagement preparation state that maintains a state immediately before the engaged state, the first engagement element is one of the two or more of the engagement elements that are disengaged and is used to form an intermediate gear stage, and the intermediate gear stage has a lower transmission ratio than the post-shifting gear stage,
after executing the first process, execute a second process that engages a second engagement element, which is one of the engagement elements used to form both the intermediate gear stage and the post-shifting gear stage, and temporarily increases engagement pressure of the first engagement element, and
after executing the second process, execute a third process that disengages the first engagement element and engages a third engagement element, which is one of the engagement elements used to form the post-shifting gear stage, to form the post-shifting gear stage.

2. The controller according to claim 1, wherein
the processing circuitry is configured to, when none of the two or more of the engagement elements, which are disengaged when the skip downshift is started, is used to form the intermediate gear stage, execute an alternative process instead of executing the first process, and
the alternative process sets one of the engagement elements that is used to form both the intermediate gear stage and a gear stage between the pre-shifting gear stage and the intermediate gear stage to the engagement preparation state.

3. The controller according to claim 1, wherein
the automatic transmission includes four or more of the engagement elements,
each gear stage is formed when corresponding three of the engagement elements are in the engaged state, and
two of the engagement elements are disengaged when the skip downshift is started.

4. The controller according to claim 1, wherein
the automatic transmission is used for a hybrid vehicle that includes the internal combustion engine and an electric motor as prime movers,
the hybrid vehicle includes a clutch mechanism configured to be switched between a coupled state, in which the output shaft of the internal combustion engine is coupled to an output shaft of the electric motor, and an uncoupled state, in which the output shaft of the internal combustion engine is uncoupled from the output shaft of the electric motor, and
the input shaft of the automatic transmission is configured to be connected to an output shaft of the clutch mechanism.

5. A method for controlling an automatic transmission of a planetary gear type, wherein the automatic transmission includes multiple friction-type engagement elements and an input shaft configured to be connected to an output shaft of an internal combustion engine, each of the engagement elements is configured to be switched between an engaged state and a disengaged state, and a change in combination of ones of the engagement elements that are in the engaged state changes a gear stage of the automatic transmission, the method comprising:

when starting a skip downshift that shifts the gear stage from a pre-shifting gear stage to a post-shifting gear stage, which is two or more stages lower than the pre-shifting gear stage, through a single shifting operation, disengaging two or more of the engagement elements that are in the engaged state, wherein the disengaging two or more of the engagement elements includes setting a first engagement element to an engagement preparation state that maintains a state immediately before the engaged state, the first engagement element is one of the two or more of the engagement elements that are disengaged and is used to form an intermediate gear stage, and the intermediate gear stage has a lower transmission ratio than the post-shifting gear stage, subsequently, engaging a second engagement element, which is one of the engagement elements used to form both the intermediate gear stage and the post-shifting gear stage, and temporarily increasing engagement pressure of the first engagement element; and subsequently, disengaging the first engagement element and engaging a third engagement element, which is one of the engagement elements used to form the post-shifting gear stage, to form the post-shifting gear stage.

\* \* \* \* \*